Figure 1:
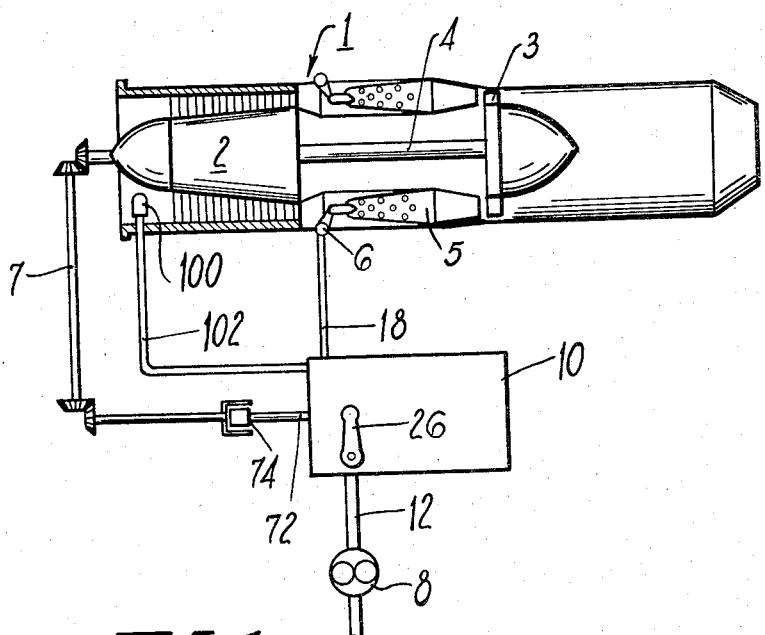

April 7, 1959   G. W. WALLACE ET AL   2,880,580
EMERGENCY SAFETY MECHANISM FOR FUEL CONTROL DEVICES
Filed March 3, 1954   2 Sheets-Sheet 1

ANDREW A. KUZMITZ
GLEN W. WALLACE
INVENTORS

BY
*Robert E. Smith*
ATTORNEY

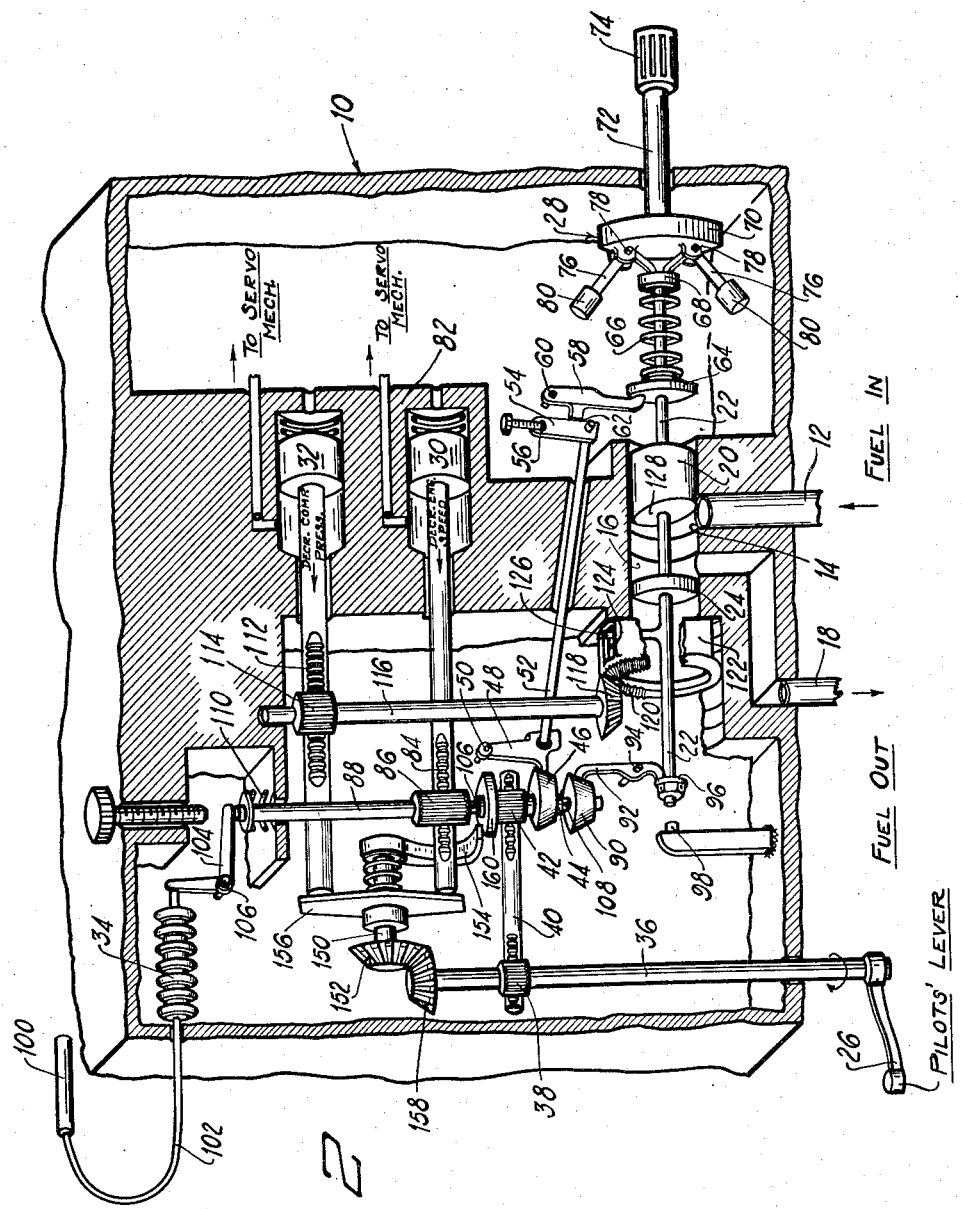

United States Patent Office 2,880,580
Patented Apr. 7, 1959

2,880,580

EMERGENCY SAFETY MECHANISM FOR FUEL CONTROL DEVICES

Glen W. Wallace and Andrew A. Kuzmitz, South Bend, Ind., assignors to Bendix Aviation Corporation, South Bend, Ind., a corporation of Delaware Application March 3, 1954, Serial No. 413,840

10 Claims. (Cl. 60—39.28)

This invention is an improvement of the fuel control mechanism disclosed in the copending application of Harry C. Zeisloft, Serial No. 248,402, filed September 26, 1951 (common assignee), now abandoned, and particularly relates to gas turbine engine fuel control emergency safety mechanism.

Heretofore, fuel control devices for gas turbine engines of the type used in aircraft have depended solely on a primary or main fuel metering device for proper operation, or have included, in addition to the primary device, secondary or emergency metering means operable only upon a failure of the main system. Of the latter dual control type, various methods have been utilized in the past in an attempt to insure that the emergency metering means would instantaneously assume the fuel metering function upon failure, for any reason, of the main system. Many such systems have depended on various types of fuel pressure sensors to initiate a switch-over from the main to the emergency fuel control means upon a failure of the former. It has been found that such arrangements are subject to serious limitations, particularly with respect to the lack of sufficient rapidity of response for switch-over. In such an arrangement instantaneous response is of utmost importance during, for example, a take-off of the aircraft when a failure of the main fuel control system will result in an immediate loss of power and, in all probability, consequent collision of the craft with possible loss of life unless automatic switch-over to an emergency fuel control device is instantaneous. Many fuel control systems presently in use do not provide for a sufficiently rapid switch-over from the main to the emergency fuel control. In addition, many such emergency fuel controls are relatively complex in nature and substantially increase the overall weight and complexity of the total control system.

It is therefore one of the primary objects of this invention to provide an emergency fuel control mechanism for gas turbine engines including a simple, compact and reliable mechanism for insuring against loss of power should the main fuel control fail during, for example, take-off operation of the aircraft.

Another object of this invention is to provide in a fuel control device for gas turbine engines, manually actuable mechanism for emergency operation arranged in such a manner that failure of main fuel control means cannot result in any substantial loss of engine power output under certain operating conditions.

The above and other objects of the invention will be apparent from the following description of the apparatus taken in conjunction with the accompanying drawings wherein:

Figure 1 is a schematic diagram of a control system for a gas turbine engine in accordance with the present invention; and Figure 2 is a schematic cut-away view of a fuel control device embodying the present device.

In Figure 1, a gas turbine engine is generally designated by numeral 1, and includes a compressor 2 driven by a turbine 3 through connecting shaft 4. A fuel control mechanism contained in housing 10 is provided, which control mechanism receives fuel through a main fuel pump 8 and an inlet conduit 12 and supplies it along a fuel conduit 18 to the main fuel manifold 6 which includes fuel nozzles individually disposed in combustion chambers or burners 5. A temperature responsive element 100 is located in the inlet of compressor 2, and transmits a signal through conduit 102 responsive to the compressor air inlet temperature. Mechanical connection 7 is rotated proportional to the speed of turbine 3 and compressor 2 and is connected to gear 74 and shaft 72 of the fuel control apparatus.

Referring now to the Figure 2, fuel control mechanism is shown contained within a housing 10. Fuel is pressurized to said housing by a pump 8, shown in Figure 1, through an inlet conduit 12 which terminates in a fuel metering orifice 14 through which the fuel flows to engine burners 5, shown in Figure 1, through a metering valve cylinder 16, and an engine fuel delivery conduit 18. A fuel metering valve 20 having a stem 22 extending from either end thereof, on which is mounted a guide land 24, is reciprocable and rotatable in the valve cylinder 16 and is actuable to control the effective area of orifice 14 by means of a manually actuable pilot's control lever 26; engine all-speed governing means 28; a hydraulically actuated piston 30, positionable as a function of engine speed by means of servo-mechanism, not shown; a second hydraulically actuated piston 32, positionable as a function of a pressure which varies as a function of altitude by means of servo-mechanism, not shown; and a liquid filled temperature responsive bellows or thermostat 34 movable as a function of an engine operating temperature which varies as a function of ambient temperature; each of said valve actuating means being operatively connected to said valve by mechanism to be described. Servo-mechanism which may be readily adapted for use with the speed and power pistons 30 and 32, respectively, is disclosed in the copending application of Harry C. Zeisloft, supra.

The pilot's control lever 26 is connected to the metering valve 20 by means of a control shaft 36, a pinion 38, a rack member 40, a pinion 42 which is mounted on an outer hollow shaft 44, a throttle setting cam 46 also rotatably mounted on shaft 44, a cam follower member 48 pivoted at 50 and adapted to impart axial movement as a function of the contour of cam 46 to a link 52 which is connected at its opposite end to a lever 54 pivoted at 56, a lever 58 pivoted at 60 which abuts one edge of lever 54 at 62 and the face of a spring retainer plate 64 mounted on valve stem 22 and axially actuatable with relation thereto, and a governor spring 66 held between plate 64 and a flange 68 which is rigidly connected to the one end of valve stem 22.

The governor 28 comprises, in addition to the adjustable governor spring 66, a rotatable plate member 70 adapted to be driven by the engine through a shaft 72 and a splined member 74, lever arms 76 pivoted at 78 and adapted to bear against flange 68 at all times, and centrifugal weights 80 mounted on the ends of levers 76 for rotation therewith.

The engine speed piston 30 assumes a position within hydraulic cylinder 82 which is always a function of existing engine speed, said piston being operatively connected to metering valve 20 by means of a rack 84, a pinion 86 fixedly mounted on a shaft 88 which is telescoped within shaft 44 and may rotate independently thereof, a contoured acceleration cam 90 also mounted on shaft 88, and a cam follower lever 92 pivoted at 94 and adapted to engage a flange 96, which is mounted on valve stem 22, during an acceleration of the engine.

Acceleration of the engine may be initiated by rotating pilot's lever 26 in a counterclockwise direction, as viewed from the lower end of shaft 36, which actuates the throttle scheduling cam 46 counterclockwise to a point of greater cam rise and moves levers 48, 54 and 58 counterclockwise thereby compressing governor spring 66 an amount which is a function of the new cam rise, which results in rightward or opening movement of valve 20 and corresponding movement of valve stem 22 and flange 96 to a position defined by the position of acceleration cam follower lever 92. The position of follower lever 92, at any given engine speed, is a function of the rise of cam 90 at that speed. The engine begins to accelerate immediately after an increase in fuel flow thereto which follows opening of valve 20 and which results in, among other things, a rotation of cam 90. During such an acceleration, the area of metering orifice 14 is effectively controlled by cam 90 in such a manner that the acceleration rate of the engine tends to optimize within the engine limitations of compressor surge or stall and allowable turbine inlet temperature. As the engine approaches the speed selected by the pilot, centrifugal weights 80 fly outwardly to further compress spring 66, to move valve 20 in a closing direction, and to actuate flange 96 and valve stem 22 away from follower 92 toward a minimum flow stop 98. Metering valve 20 continues to move in a closing direction until a steady state condition of engine operation is reached at the selected speed. The all-speed governor 28 controls valve 20 to maintain selected speeds irrespective of variations in engine operating conditions. Pressure regulator valve means, not shown, such as disclosed and claimed in the copending application of Harry C. Zeisloft, supra, may be utilized to maintain a constant pressure drop across metering orifice 14 under all conditions of operation.

The temperature responsive bellows 34 is connected to a temperature bulb 100 by means of a capillary tube 102, and to scheduling cam 46 and acceleration cam 90 by means of a lever 104, pivoted at 106, and telescoped shafts 88 and 44, said shaft 88 having pins 106 and 108 for carrying shaft 44 whenever shaft 88 is actuated axially as a result of a variation in that engine operating temperature to which bellows 34 responds. The temperature bulb 100 is preferably located at the inlet to the compressor, so that bellows 34 responds to compressor inlet temperature and axially actuates cams 46 and 90 to a position which is a function of said temperature. Cam 46 has a peripheral contour which varies not only as a function of pilot's lever position but also as a function of compressor inlet temperature, whereby, under certain conditions such as at high altitudes and/or at low compressor inlet temperatures, bellows 34 contracts, resulting in upward actuation of the cams by a spring 110, which in turn results in a resetting of governor 28 for steady state operation and a new schedule of acceleration fuel flow. This arrangement is more fully described and is claimed in the copending application of Andrew A. Kuzmitz, Serial No. 413,318, filed March 1, 1954, now abandoned, which is assigned to the assignee of the present application.

In addition to controlling the axial position of metering valve 20 by means of governor 28, acceleration cam 90, and thermostat 34, servo-motor piston 32, which is positioned as a function of compressor discharge pressure, is operatively connected to metering valve 20 by means of a rack and pinion 112, 114, a shaft 116, and a bevel gear 118 mounted on the end of shaft 116 and adapted to mesh with a gear sector 120 formed on the annular lip of a cylindrical sleeve 122 having a slot 124 in the wall thereof which is adapted to engage a transversely extending stem 126 rigidly mounted on valve stem 22. Piston 32 is actuated leftwardly as a function of decreasing compressor discharge pressure thereby rotating bevel gear 118 in a clockwise direction and sleeve member 122 in a counterclockwise direction, as viewed from the left end of valve stem 22, which results in like rotation of stem 126 and metering valve 20.

The face 128 of valve 20 is sloped, as shown, in such a manner that the angular position of valve 20 defines a metering area at orifice 14 which is always a function of existing compressor discharge pressure. During an acceleration of the engine, for example, the axial position of valve 20 is controlled by acceleration cam 90 as a predetermined function of engine speed and compressor inlet temperature, whereas the angular position of said valve is controlled as a predetermined function of compressor discharge pressure, and the net effective area of metering orifice 14 varies in such a manner that engine acceleration proceeds at an optimum rate under compressor stall and/or turbine temperature limitations.

In addition to the various means hereinbefore described for controlling the fuel metering position of valve 20, this invention provides emergency limiting means operatively connected to pilot's lever 26 and adapted to fix the axial and angular position of metering valve 20 for emergency operation of the engine at maximum power, in such a manner that the aircraft may safely take-off or fly at substantially maximum power even though the main metering valve control mechanism, hereinbefore described, should, for any reason, fail. The said emergency limiting means comprises a rotatable shaft 150 having a bevel gear 152 mounted on one end thereof, a temperature bias limit member 154 fixedly mounted on the opposite end thereof, and a power and speed rack limit member 156 fixedly mounted in a predetermined position intermediate gear 152 and limit member 154, said gear 152 being adapted to mesh with a bevel gear 158 which is mounted on the one end of shaft 36, whereby the angular positions of limit members 154 and 156 are a function of pilot's control lever position. The temperature bias limit member 154 and the rack limit member 156 are positioned on shaft 150 such that said member 154 functions as a low temperature stop, and said member 156 functions as a minimum speed and power stop with respect to speed rack 84 and power rack 112, whenever pilot's lever 26 is placed in the take-off or maximum power position, as shown. So long as lever 26 remains in take-off power position, the minimum axial and angular flow metering position to which valve 20 can travel, at any given compressor inlet temperature not below that limited by the position of temperature bias limit member 154, is determined by the position of speed rack 84 when in contact with the lower end of rack limit member 156 and the position of power rack 112 when in contact with the upper end of rack limit member. This minimum flow position of valve 20 at maximum engine power demand may obviously be suitably predetermined by positioning members 154 and 156 on shaft 150 as desired, so that a safe take-off of the aircraft is insured under any and all conditions of operation in the event the main metering system fails, for any reason, and racks 84 and/or 112 are actuated into abutment with rack limit member 156. Temperature bias limit member 154, in conjunction with a flange 160 mounted on shaft 44, predetermines the minimum compressor inlet temperature position to which shafts 44 and 88 may be actuated. In practice, rack limit member 156 and temperature bias limit member 154 may be positioned such that they prevent the metering area from ever being less than that required for a hot day take-off less 5 percent fuel flow.

The drawings illustrate all of the mechanism hereinbefore described in the approximate relative position which would exist during take-off operation of the aircraft at sea level on a relatively hot day. In all positions of pilot's lever 26, excepting take-off position, limit member 156 is misaligned with racks 84 and 112 and limit member 154 is out of position with respect to flange 160, so that racks 84 and 112 and temperature shaft 88 always assume a position which is a true measure of the engine parameter to which each responds.

Obviously, the nature of the limiting mechanism herein disclosed is subject to many variations which will be apparent to those skilled in the art. For example, limiting mechanism may be arranged to be manually actuated, so as to engage notches in the racks 84 and 112 and the temperature shaft 88 whenever pilot's lever 26 is placed in a take-off position. Alternatively, pilot's lever 26 may be adapted to close an electrical switch when in take-off position for energizing solenoids which may be adapted, when energized, to limit leftward movement of racks 84 and 112 and upward movement of shaft 88.

Having thus described the various features of the invention, what we claim as new and desire to secure by Letters Patent is:

We claim:

1. A fuel feed and power control system for a gas turbine engine having a burner and a compressor comprising a fuel conduit for conducting fuel to the burner, valve means for controlling the flow of fuel through said conduit, pilot actuated control means for actuating said valve means, means operatively connected to said valve means for controlling the position thereof including a first member responsive to variations in engine speed, a second member responsive to variations in compressor discharge pressure and a third member responsive to variations in compressor inlet temperature, and limiting means operatively connected to said pilot control means including a first element for limiting the travel of said first and second members in a flow decreasing direction for take-off operation of the engine and a second element for limiting the travel of said third member in a predetermined direction for take-off operation of the engine.

2. A fuel feed and power control system for a gas turbine engine having a burner comprising a fuel conduit for conducting fuel to the burner, valve means for controlling the flow of fuel through said conduit, pilot actuated control means for actuating said valve means, means operatively connected to said valve means for controlling the position thereof including means responsive to at least one engine operating condition related to power output of said engine, and limiting means operatively connected to said pilot control means for limiting the movement of said condition responsive means in a predetermined direction for take-off operation of the engine.

3. A fuel feed and power control system for gas turbine engines having a burner comprising a fuel conduit for conducting fuel to the burner, valve means for controlling the flow of fuel through said conduit, manual means for actuating said valve means, means operatively connected to said valve means for controlling the position thereof including means responsive to at least one engine operating condition related to power output, and control means operatively connected to said manual means and operative over a predetermined range thereof becoming effective following a failure of said condition responsive means to limit the travel of said condition responsive means in a predetermined fuel flow controlling position.

4. A fuel feed and power control system for gas turbine engines having a burner comprising a fuel conduit for conducting fuel to the burner, valve means for controlling the flow of fuel through said conduit, pilot actuated control means for actuating said valve means, means operatively connected to said valve means for controlling the position thereof including means responsive to at least one engine operating condition related to power output of said engine, and emergency control means operatively connected to and actuatable by said pilot control means for controlling said valve means during emergency take-off operation of the engine.

5. A fuel control for engines comprising a fuel conduit, valve means for controlling the flow of fuel through said conduit, pilot control means for actuating said valve means, means operatively connected to said valve means for controlling the position thereof including means responsive to at least one engine operating condition related to power output of said engine, and emergency control means operatively connected to said pilot control means for limiting the travel of said condition responsive means in a predetermined direction during take-off operation of the engine.

6. A control system as claimed in claim 3 wherein the engine operating condition to which said condition responsive means responds is engine speed.

7. A control system as claimed in claim 3 wherein the engine operating condition to which said condition responsive means responds is a pressure derived from the compressor.

8. A control system as claimed in claim 3 wherein the engine operating condition to which said condition responsive means responds is a temperature which varies as a function of ambient temperature.

9. A fuel feed and power control system for a gas turbine engine having a burner comprising a fuel conduit for conducting fuel to the burner, valve means for controlling the flow of fuel through said conduit, first manual means connected to said valve means for actuating same to accelerate or decelerate the engine, means operative to limit the travel of said valve means for controlling the fuel flow regulating position thereof during engine acceleration, and second manual means connected to said first manual means operative to limit the travel of said latter means during high power operation of the engine for limiting the minimum fuel flow controlling position of said valve means.

10. A fuel feed and power control system for a gas turbine engine having a burner comprising a fuel conduit for conducting fuel to the burner, valve means for controlling the flow of fuel through said conduit, manual means connected to said valve means for actuating same to accelerate or decelerate the engine, engine condition responsive means operative to limit the travel of said valve means for controlling the flow regulating position thereof during engine acceleration, and means actuatable into operative relation with said condition responsive means by said manual means for limiting the position of said condition responsive means irrespective of variations in said engine condition.

References Cited in the file of this patent

UNITED STATES PATENTS

| 2,336,052 | Andersen et al. | Dec. 7, 1943 |
| 2,668,414 | Lee | Feb. 9, 1954 |
| 2,673,556 | Reggio | Mar. 30, 1954 |
| 2,675,674 | Lee | Apr. 20, 1954 |
| 2,683,965 | Nagely | July 20, 1954 |
| 2,737,776 | Strough | Mar. 13, 1956 |

FOREIGN PATENTS

| 575,013 | Great Britain | Jan. 30, 1946 |
| 660,655 | Great Britain | Nov. 7, 1951 |